CIRCUIT INTERRUPTER SYSTEM UTILIZING STATIC DEVICES

Filed July 9, 1957

4 Sheets-Sheet 3

United States Patent Office 3,058,034
Patented Oct. 9, 1962

3,058,034

CIRCUIT INTERRUPTER SYSTEM UTILIZING STATIC DEVICES

Jerome Sandin, Forest Hills, Pa., assignor to Westinghouse Electric Corporation, East Pittsburgh, Pa., a corporation of Pennsylvania Filed July 9, 1957, Ser. No. 670,683
17 Claims. (Cl. 317—9)

My invention relates generally to circuit interrupters, and it has reference in particular to the use of semiconductors in circuit interrupting service.

Generally stated, it is an object of my invention to provide a static circuit interrupter that is reliable and effective in operation.

More specifically, it is an object of my invention to provide for using transistors to limit the load current in a circuit by controlling the base current thereof.

Another object of my invention is to provide for using a transistor to limit the current in a circuit, and for using the increased voltage drop across the transistor during an overcurrent to effect operation of the trip means of a switch in the circuit.

Yet another object of my invention is to provide for using a semiconductor to interrupt an overcurrent in a circuit after first increasing the base current of the transistor to permit it to conduct greater than a normal value of current in response to an overcurrent.

It is also an object of my invention to provide for using a semiconductor to interrupt an overcurrent in a circuit by reducing or reversing the base current thereof in response to an increase in current in the circuit.

Yet another object of my invention is to provide for using a transistor to interrupt an overcurrent in a circuit by utilizing a Zener diode having a predetermined breakdown voltage to provide a threshold of operation above which the base current of the semiconductor is reduced to block the flow of current in the circuit.

An important object of my invention is to provide for using semiconductor devices in a circuit to limit the value of a fault current so that a circuit interrupter may safely open the circuit.

It is also an important object of my invention to provide for using transistors in a load circuit with a minimum value of base current for operation under normal current conditions, and for increasing the base current upon the occurrence of an overcurrent to permit the transistor to conduct an increased value of current up to a predetermined maximum value which a circuit breaker can safely interrupt.

Other objects will, in part, be obvious and will, in part, be explained hereinafter.

In practicing my invention in accordance with one of its embodiments, a first transistor is connected in series between a load circuit and a source, and sufficient base bias is provided to permit it to conduct normal load currents. A second transistor is used in conjunction with a Zener diode which responds to the voltage drop across the first transistor to change the base current thereof upon the occurrence of an overload or fault so as to cause the first transistor to reduce or substantially block the flow of current to the load circuit. The increased voltage drop across the first transistor is used to operate the trip device of a circuit breaker to isolate the load circuit from the source.

For a more complete understanding of the nature and scope of my invention, reference may be made to the following detailed description which may be read in connection with the accompanying drawings, in which.

Figure 1:
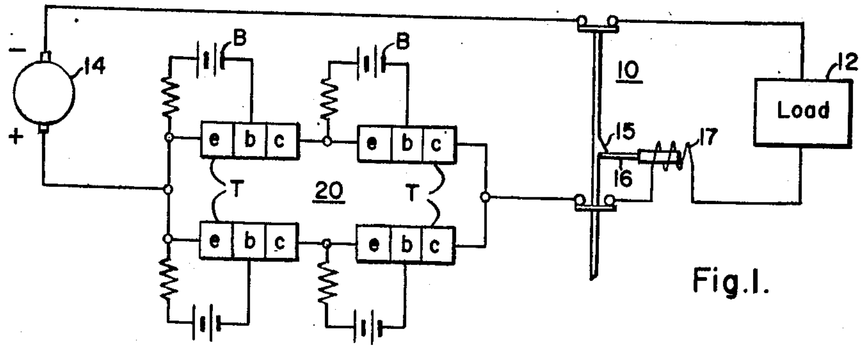
FIG. 1 is a schematic diagram of a load circuit utilizing transistors to limit the fault current thereof.

Referring particularly to FIG. 1, the reference numeral 10 may denote generally a circuit breaker connecting a load 12 to a source, such as the generator 14. The circuit breaker 10 may be of any suitable type, being closed either manually or by any suitable mechanism (not shown), and is herein shown schematically as being held closed by means of a latch 15 which engages a releasable latch member 16 disposed to be actuated by a trip coil 17 in response to a predetermined overcurrent of, for example, about 200% of normal load current.

In order to permit the circuit breaker 10 to safely interrupt the circuit and disconnect the load 12 therefrom in the event of a short circuit, for example, in which the overcurrent may otherwise rapidly rise to a value in excess of the interrupting capacity of the breaker 10, current limiting means 20 is provided. The current limiting means 20 may comprise either one or a plurality of transistors T of any suitable type such as the fused junction, silicon, germanium or other suitable type, for example, connected in series with the load 12 and source 14. For the purpose of illustration, four such transistors T are shown connected in a series-parallel arrangement, it being realized that this arrangement may be varied to suit the current and voltage requirements of the circuit. Each of the transistors is provided wtih a suitable base bias represented by a battery B which is in each instance connected between the base electrode *b* and the emitter *e* of the transistor so as to make the base negative with respect to the emitter in the case of a P-N-P type of a transistor.

Figure 2:
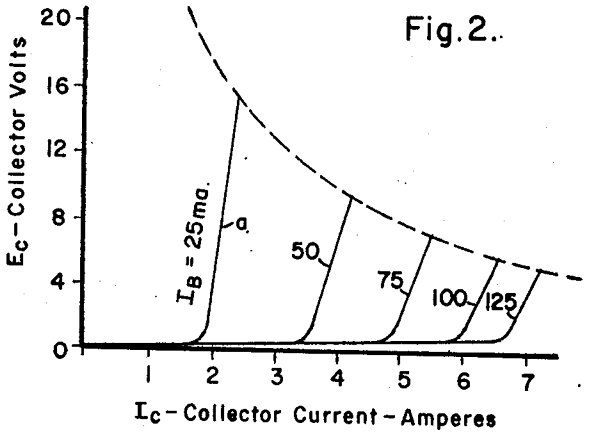
FIG. 2 shows a curve illustrating different characteristic collector-current-voltage curves for different values of base current for one type of transistor.

Referring to FIG. 2, it will be seen from the curve (*a*), for example, that for a given value of base current only a substantially predetermined value of collector-to-emitter current will flow through the transistor. The base current may, therefore, be adjusted to provide for a current flow, for example, of approximately 200% of the normal load current. Should a short circuit occur, the current limiting means 20 will limit the current to substantially the value set by the base current, and the trip means 17 of the circuit breaker 10 which may be set to trip instantaneously or with suitable delay at approximately 200% or lower, if desired, of normal current, will be able to open the breaker, which can then safely interrupt the circuit since the maximum current in the circuit is effectively limited.

Figure 3:
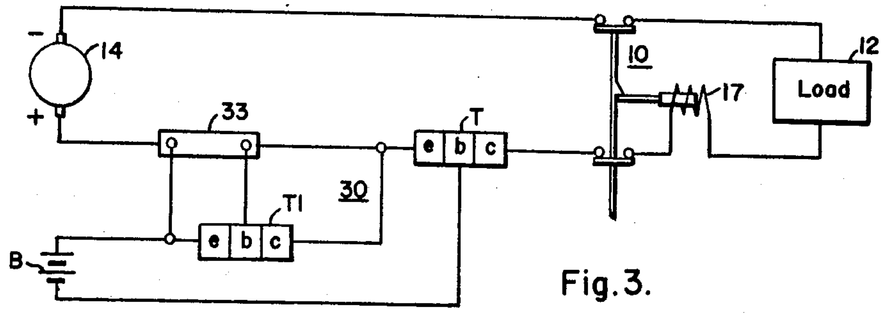
FIG. 3 is a schematic diagram showing an application of the invention in a different form.

Referring to FIG. 3, the reference numeral 10 denotes generally a circuit breaker connecting a load 12 to a generator 14, the circuit breaker being provided with a series trip coil 17 for tripping the breaker in response to an overload in a manner similar to that shown in FIG. 1. Connected in series with the load 12 and generator 14 is current limiting means 30 comprising a transistor T, which may represent either a single transistor of suitable capacity or a multiple arrangement, such as shown in FIG. 1. The transistor T is normally provided with a minimum value of base current by means of a battery B which is connected between the base *b* and the emitter *e* to permit the transistor to normally conduct the normal load current of the load 12.

In order to permit the load current to increase above the normal value, a control transistor T1 may be connected in circuit with the battery B to control the flow of base current, so that the base current of the transistor normally permits only the full load current of the load 12 to flow. Current responsive control means may be provided for increasing the base current in response to a predetermined increase in the load current. For example, a shunt 33 may be connected in series with the generator 14 and load 12, and connected to increase the base current of the control transistor T1 in response to an overload, so as to permit the transistor T to conduct momentarily the increased current. The trip coil 17 may be arranged to trip the circuit breaker 10 instantaneously on some value of current which is less than the maximum increased value permitted by the current responsive means 33.

Figure 4:
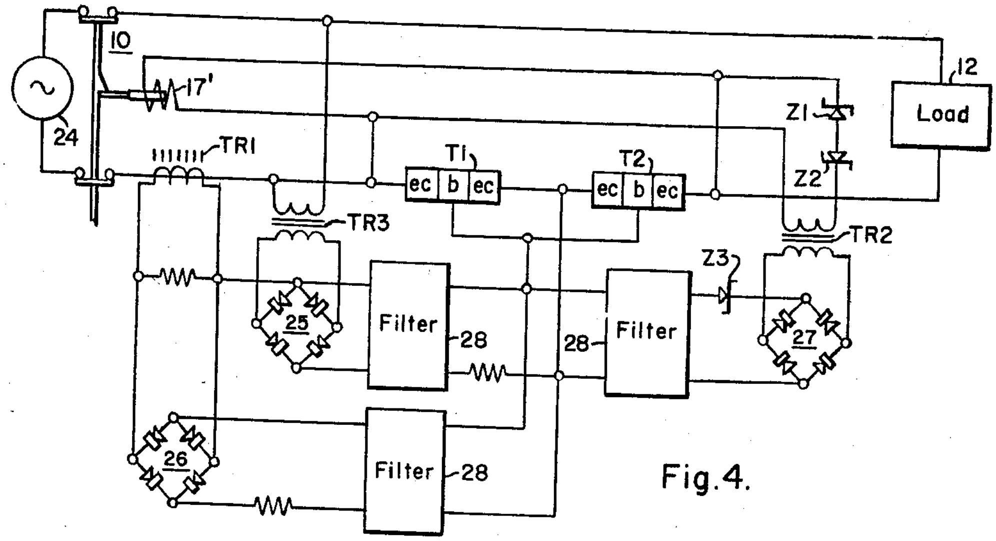
FIG. 4 is a schematic diagram showing an application of the invention to an alternating-current load circuit.

Referring to FIG. 4, it will be seen that a circuit breaker 10 having a trip coil 17′ is utilized to connect a load 12 to a source represented by an alternating current generator 24.

In order to interrupt the connection of the load 12 to the generator 24, transistors T1 and T2, which may be of a symmetrical type, having base electrodes *b* and associated symmetrical emitter-collector electrodes *e-c*, are connected in series with the load 12 and generator 24. A transformer TR3 is connected across the generator 24 on the load side of the circuit breaker 10 for supplying normal base excitation to the transistors T1 and T2 through a rectifier bridge circuit 25 and a filter 28 to permit the transistors to conduct normal load current. In order to permit the transistors to supply greater than normal load current and up to a predetermined maximum value of, for example 500% of normal rated current, a saturable current transformer TR1 is connected in series with the load 12 and generator 24, and is connected to supply additional base current to the transistors T1 and T2 through a bridge circuit 26, so as to increase the base current in accordance with the load current up to the predetermined value of 500%, at which the transformer TR1 is designed to saturate and limit its output.

In order to provide for interrupting the connection of the load 12 to the generator 24 when the current exceeds this maximum value, a transformer TR2 is connected across the transistors T1 and T2 to be energized by the voltage drop across the transistors which increases when the current in the circuit attempts to increase above the value for which base current is supplied. A pair of Zener diodes Z1 and Z2, which have a breakdown value approximately equal to the voltage drop across the transistors T1 and T2 when the load current exceeds the predetermined value of 500%, is connected in opposed relation in series with the primary winding of the transformer TR2. This transformer is connected to the base circuit of the transistors T1 and T2 through a rectifier bridge circuit 27 and a filter 28 so as to produce an output voltage of approximately 3 volts for breaking down a Zener diode Z3 to apply a blocking bias to the base electrodes *b* of the transistors T1 and T2 to render them non-conductive when the load current exceeds 500%.

In normal operation, the transformer TR3 supplies a normal base excitation of approximately 1½ volts, for example, to the base electrodes *b*, making the base electrodes negative with respect to the emitter so as to render the transistors T1 and T2 conductive. Should the current of the load 12 increase above a normal value, the current transformer TR1 applies a correspondingly increasing voltage to the base electrodes *b* through the rectifier bridge circuit 26 and filter 28 so as to increase the current capacity of the transistors T1 and T2.

Should the load current exceed 500% of normal current, the voltage across the transistors T1 and T2 increases rapidly since the base excitation is not increased any further due to saturation of the current transformer TR1. Accordingly, sufficient voltage is applied to the Zener diodes Z1 and Z2 to effect breakdown thereof, and transformer TR2 thereafter produces sufficient voltage to break down the Zener diode Z3 and apply reverse base excitation to the transistors T1 and T2 to reduce the collector current and/or effect cutoff. The trip 17′, which is connected across the transistors T1 and T2, will thereupon be subjected to the full voltage of the circuit, and opens the circuit breaker 10, isolating the load from the generator 24.

Figure 5:
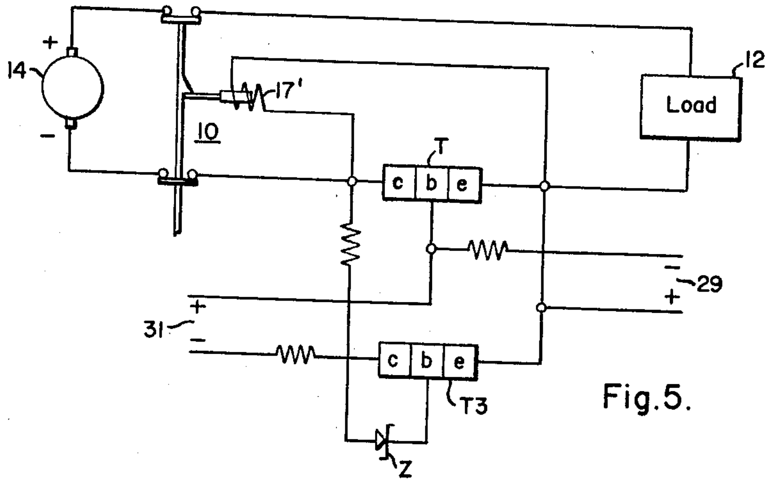
FIG. 5 is a schematic diagram of an interrupter circuit embodying the invention in yet another form.

Referring to FIG. 5, it will be seen that a circuit breaker 10 having a shunt trip coil 17′ is utilized to connect a load 12 to a generator 14. A transistor T is connected in series with the load 12 and generator 14 for controlling the connection of the load to the generator. The base excitation for the base electrode *b* of transistor T is normally provided from a 1½ volt source 29, such as a battery, which is connected between the emitter *e* and base *b* of the transistor.

In order to provide for reducing the base current of the transistor T, an additional transistor T3 is provided for controlling the connection of a reverse bias represented by a source 31 such as a battery comprising, for example, a 3-volt battery, to the base *b* of transistor T to force it to cutoff. The transistor T3 may be connected between the battery 31 and transistor T so as to normally prevent the battery 31 from being effective. The base electrode *b* of the transistor T3 may be connected to the collector *c* of the transistor T through a Zener diode Z which has a breakdown value approximately equal to, or somewhat less than, the voltage across the transistor T when the load current exceeds the predetermined normal value, reaching a maximum value, for example, of approximately 200% of normal current. The shunt trip coil 17′ of the circuit breaker 10 may be connected across the transistor T so as to operate to open the circuit breaker whenever the voltage across the transistor T increases sufficiently.

Under normal load conditions, the battery 29 supplies a normal value of base current to the transistor T so that it is saturated and connects the load 12 to the generator 14 through the circuit breaker 10. The voltage drop across the transistor T under these conditions is below that which is necessary to break down the Zener diode Z. Should the load current exceed a value of, for example, 200% of normal current, the voltage drop across the transistor T from emitter *e* to collector *c* rises to a value sufficient to break down the Zener diode Z and provide base excitation for transistor T3. The transistor T3 saturates and connects the battery 31 to the base electrode *b* of the transistor T so as to substantially block the flow of base current from the battery 29, causing the transistor T to go to cutoff. This substantially blocks the flow of current through the load 12 so that the full voltage of the generator 14 appears across the transistor T. The shunt trip coil 17′ is thereupon energized to open the circuit breaker 10 and isolate the load 12 from the generator 14.

Figure 6:
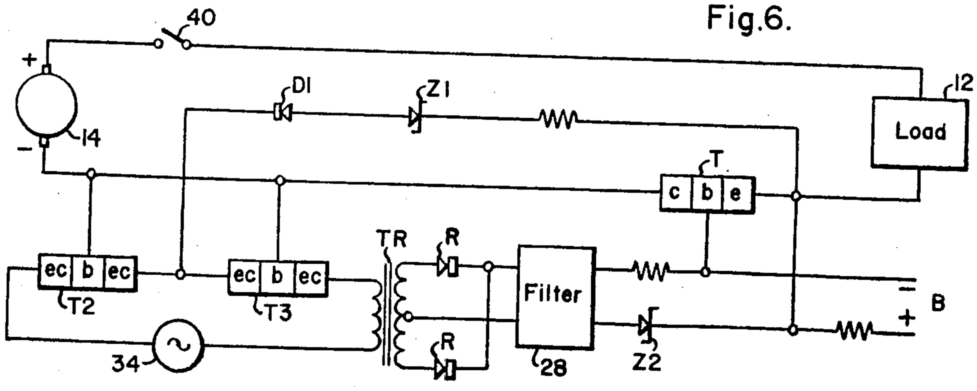
FIG. 6 is a schematic diagram of an interrupter circuit illustrating another embodiment of the invention.

Referring to FIG. 6, it will be seen that a disconnect switch 40 is utilized to connect a load 12 to a generator 14 through a transistor switch T. The transistor T is normally saturated by means of base current provided from a battery B connected between the emitter *e* and the base *b* of the transistor so as to make the base negative with respect to the emitter.

Control of the transistor T is effected by utilizing a pair of transistors T2 and T3 of the symmetrical type connected in circuit with an alternating-current source 34 and the primary winding of a transformer TR, which is connected through rectifier devices R and a filter 28′ to the base *b* of transistor T in a direction to oppose the bias from the battery B. A blocking diode Z2 of the Zener type is connected between the filter 28' and the battery B to prevent shorting the battery, and yet break down when the transistors T2 and T3 energize transformer TR. The transistors T2 and T3 are provided with base excitation in accordance with the voltage drop across the transistor T, the base electrodes *b* of T2 and T3 being, for example, connected to the collector *c* of the transistor T, and the common emitter-collector electrodes *e-c* of T2 and T3 being connected to the emitter *e* of transistor T through a Zener diode Z1 and an opposing diode D1. The Zener diode Z1 has a breakdown value approximately equal to, or slightly less than, the voltage across the transistor T when the current of the load 12 exceeds a predetermined value, such as, for example, 200% of normal current.

In normal operation, with switch 40 closed, the transistor T is saturated by voltage from the battery B and conducts the normal current for the load 12. Under this condition, the voltage drop across the transistor T is relatively low, and the Zener diode Z1 blocks the base current to the transistors T2 and T3 so that they are at cutoff. When an overload or a fault occurs, the voltage across the transistor T increases, and Zener diode Z1 breaks down, permitting a negative bias to be applied to the base electrodes *b* of the transistors T2 and T3 causing them to saturate. Alternating current from the source 34 is then applied to the transformer TR through the transistors T2 and T3, and the output of the transformer TR is rectified by the rectifiers R and is of sufficient voltage (approximately 3 volts) so as to cause breakdown of Zener diode Z2 and block the flow of base current from the battery B causing the transistor T to go to cutoff. This substantially blocks the flow of current through the load 12, so that the load may be readily disconnected from the generator 14 by opening the disconnect switch 40.

Figure 7:
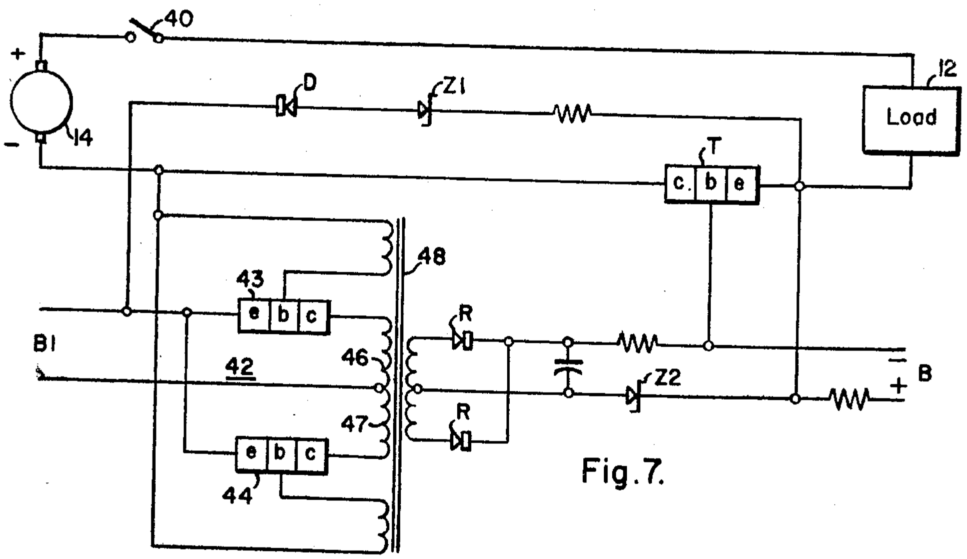
FIG. 7 is a schematic diagram of an interrrupter circuit illustrating yet another embodiment of the invention.

Referring to FIG. 7 of the drawings, it will be seen that a transistor T is utilized to block the flow of current to a load 12 from a generator 14, and a disconnect switch 40 is provided in the circuit for isolating the load from the generator in a manner similar to that shown in FIG. 6. The transistor T is normally saturated by means of base current supplied from a battery B which makes the base *b* negative with respect to the emitter *e* for the P-N-P type of transistor shown. The transistor T is made to go to cutoff by means of a blocking potential applied to the base electrode *b* to prevent the flow of base current from the battery B.

In this embodiment of the invention, a static inverter 42 having a pair of transistors 43 and 44 for sequentially switching an input voltage to windings 46 and 47 of a transformer 48 is provided for furnishing an alternating current voltage having a frequency proportional to the voltage across the transistor T. This inverter may be of substantially the same type as is described in detail in Paper 55–73 of G. H. Royer, presented at the AIEE Winter Meeting in February 1955, and published on pages 322–325 of the July 1955 AIEE Transactions, volume 74, part 1. A Zener diode Z1 and an opposing diode D are connected in circuit with inverter 42 to block the application of voltage thereto from transistor T until the current of the load 12 reaches a value sufficient to produce a voltage across the transistor to cause breakdown of the Zener diode Z1. This may be arranged to take place when the load current is approximately 200% of normal current.

In operation, the circuit of FIG. 7 operates very similarly to that of FIG. 6, in that the transistor T is normally saturated by base current supplied from the battery B. When the load current reaches about 200% of normal load current, the voltage across the transistor T rises to a value sufficient to break down the Zener diode Z1 and applies any excess over this voltage to the inverter 42 so as to produce an output voltage which is rectified by the rectifiers R, filtered, and applied through Zener diode Z2 to the base *b* of the transistor T in opposition to the voltage in the battery B so as to reduce, block or reverse the flow of base current and drive the transistor T to cutoff. Battery B1 supplies base current to the transistors 43 and 44 of the inverter.

Figure 8:
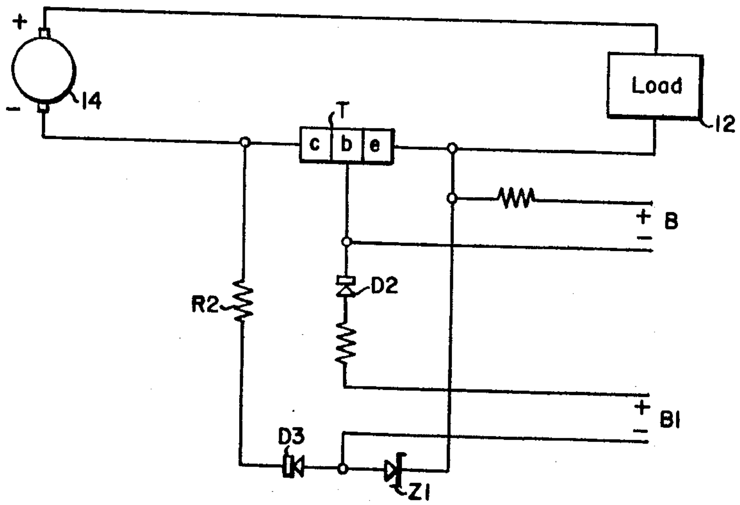
FIG. 8 is a schematic diagram of yet another form of interrupter circuit.

Referring to FIG. 8, it will be seen that a transistor T is utilized to connect a load 12 to a generator 14. The transistor T is normally saturated by a base current from a battery B which makes the base *b* negative with respect to the emitter *e*, so as to provide for conducting substantially normal load current. An auxiliary source of bias voltage, such as a battery B1, is connected to oppose the base current from the battery B. A Zener diode Z1 is connected between the emitter *e* and the negative terminal of the auxiliary battery B1 so as to normally block current flow from the battery B1. A diode D3 and a resistor R2 are connected in circuit with the Zener diode Z1 to provide a bypass circuit of high impedance around the transistor T.

Normally, the transistor T is saturated by reason of base current being provided from the battery B. Under these conditions, the voltage across the transistor T is relatively low, and the Zener diode Z1 blocks the flow of current through diode D3 and resistor R2. The Zener diode also blocks the flow of current from the battery B1 to the base *b* of the transistor. When a fault occurs, the voltage across the transistor T increases to substantially line voltage, and Zener diode Z1 breaks down, permitting current to flow from the battery B1 through the diode D2, base *b*, emitter *e*, Zener diode Z1, back to the neagtive terminal. This blocks a flow of base current from the battery B which is of the opposite polarity causing the transistor T to cut off and stop the flow of current to the load 12.

Figure 9:
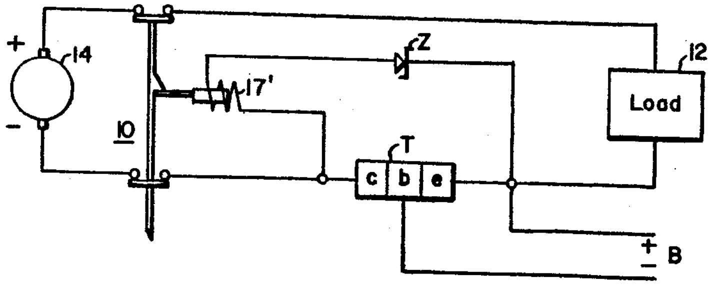
FIG. 9 is a schematic diagram of another form of interrupter circuit embodying the invention.

Referring to FIG. 9, it will be seen that a circuit breaker 10 is utilized to connect a load 12 to a generator 14. A transistor T is connected in series with the load 12 and the generator 14, and has associated therewith a source of bias, such as a battery B, which is connected to make the base *b* negative with respect to the emitter *e*. This bias is sufficient to permit the flow of normal load current. The breaker 10 is provided with a shunt trip coil 17' which is connected across the transistor T through a Zener diode Z which is connected to normally block the flow of current to the trip coil.

When an overload occurs, the transistor limits the flow of load current to a predetermined value as determined by the base current in the battery B, and this may be selected as some value between 100% and 500% of normal load current so that the breaker 10 can safely interrupt it. As soon as the current increases, the voltage drop across the transistor rises sharply causing breakdown of the Zener diode Z, and any further rise in voltage is effective in energizing the trip coil 17' to open the circuit breaker 10.

Figure 10:
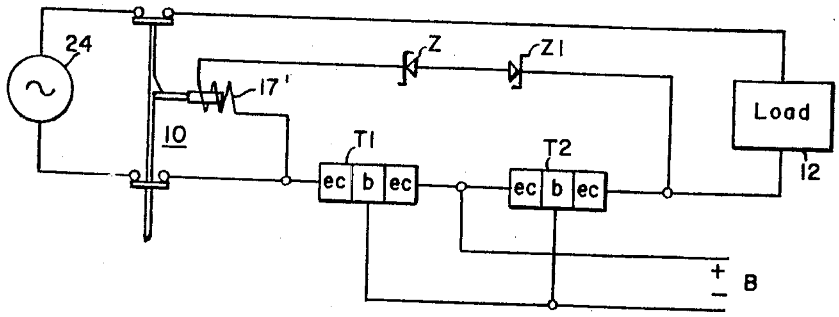
FIG. 10 is a schematic diagram showing an application of the invention to an alternating-current-load circuit.

Referring to FIG. 10, the reference numeral 10 designates a circuit breaker connecting a load 12 to a generator 24 which may be of an alternating-current type. Transistors T1 and T2 are connected in series with each other in series with the load 12 and generator 24. These transistors may be of a substantially symmetrical type which can conduct current in both directions under the proper conditions of bias. Normally, the transistors are saturated by means of base current supplied thereto from the battery B, making the base electrodes *b* negative. The circuit breaker 10 has a shunt trip coil 17' which is connected across the transistors in series with a pair of opposed Zener diodes Z and Z1 which have breakdown values of either slightly less than or approximately equal to the voltage across the transistors when the load current reaches a value of from 200% to 500%, for example.

Under normal load conditions, the transistors T1 and T2 are saturated and conduct successive half cycles of the alternating current. When the load current exceeds the predetermined value for which the base current is set, the voltage across the transistors rises sharply, causing breakdown of the Zener diodes Z and Z1 so that further voltage rise effects energization of the trip winding 17' to open the circuit breaker, while the transistors hold the load current within a range which is safely interrupted by the breaker.

Figure 11:
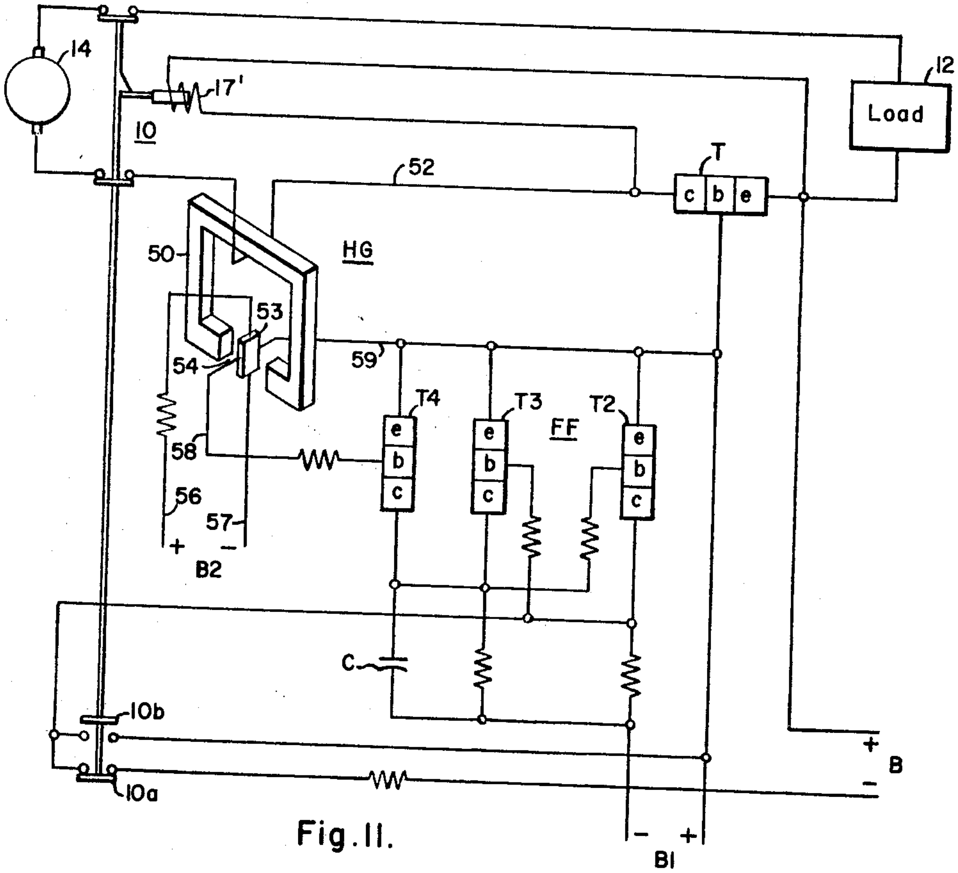
FIG. 11 is a schematic diagram showing an application of the invention utilizing a Hall generator.

Referring to FIG. 11, it will be seen that a transistor T is connected in series with a load 12 and a source such as a generator 14. A circuit breaker 10 having a trip winding 17' for opening the breaker is used to isolate the load 12 from the generator 14. The breaker is closed manually or in any other suitable manner.

The transistor T is normally saturated by base current from a source B such as a battery, which is connected to the base electrode *b* of transistor T through a contact 10*a* of breaker 10 which is closed when the breaker is closed, and transistor T2 of a Flip-Flop FF comprising cross connected transistors T2 and T3 which are connected to a source B1 such as a battery. A capacitor C normally renders transistor T2 saturated when the Flip-Flop is connected to the source B1, thus connecting the base *b* of transistor T to the source B.

A Hall generator HG is provided comprising a magnetic core 50 through which one of the conductors 52 connecting the load 12 to the source 14 passes and having a semiconductor element 53 disposed in an air gap 54, with control conductors 56 and 57 connected to a source B2, and conductors 58 and 59 connected to the base circuit of a transistor T4. Transistor T4 is connected to trigger Flip-Flop FF and render T2 unsaturated, thus opening the base circuit of transistor T when the current in the load circuit rises to a predetermined value. Contact member 10*b* of breaker 10 is connected in shunt with transistor T2 so as to increase the base current of transistor T3 and reset the Flip-Flop. The trip winding 17' is connected across the transistor T so as to operate and open the breaker when the voltage across transistor T rises upon its becoming unsaturated.

Normally, breaker 10 is closed, and transistor T2 is saturated, so that transistor T is saturated and connects load 12 to the generator 14.

When the load current increases, the magnetic flux in the air gap 54 increases, and the Hall effect produces a voltage which causes transistor T4 to saturate. This triggers the Flip-Flop FF so that transistor T3 saturates and transistor T2 becomes unsaturated interrupting the base current of transistor T, causing it to become unsaturated and reduce the load current to a small leakage value. The voltage across T rises sharply energizing trip winding 17' and opening the breaker 10. Contact 10*b* closes and resets the Flip-Flop FF. Since contact 10*a* is open, this cannot furnish base current to transistor T until the breaker 10 is reclosed, manually or otherwise.

From the above description and the accompanying drawings, it will be realized that I have provided a simple and effective manner for limiting and/or interrupting the current in the load circuit using semiconductor devices. While transistors of the P-N-P type have been shown for purposes of illustration, transistors of the N-P-N type may likewise be used without departing from the scope of the broader phases of the invention, by changing the connections to obtain the proper polarities. Transistor switches are sufficiently rapid in operation to limit the rise of current under short-circuit conditions and to permit safe interruption of the circuit. The semi-conductor devices may either be used to limit the over-current to permit both normal and predetermined overcurrents or to automatically cut off the load current either on overloads or under short-circuit conditions only.

It should be realized that where a blocking potential is applied to the base circuit, the value and polarity of the base current depend on the relative values of the normal bias voltage and the blocking voltage. If the blocking potential is less than the normal bias voltage, the base current will be decreased, reducing the collector current. If the two voltages are equal, the collector current is reduced to a small leakage current so that the transistor substantially blocks the flow of load or fault current. If the blocking potential is greater than the normal bias voltage, the base current will be reversed, and the collector current will be further reduced to a still smaller leakage current.

In addition, where a Zener diode is used, which has a predetermined breakdown voltage, the voltage applied to the diode must exceed the breakdown value, as only the excess voltage above the breakdown value is available to block the base current of a transistor, operate a trip device, or do other useful work.

Since certain changes may be made in the above-described construction and different embodiments of the invention may be made without departing from the scope or spirit thereof, it is intended that all the matter contained in the above description and shown in the accompanying drawings shall be considered as illustrative and not in a limiting sense.

I claim as my invention:

1. In combination, a circuit breaker having openable contacts and trip means energizable to open said contacts, a transistor having a base, an emitter and a collector, the emitter-collector path of said transistor being connected in series with the contacts of said breaker, means connected between said base and said emitter for supplying a bias thereto which renders the emitter-collector path of said transistor normally conducting, and a circuit shunting said transistor, siad circuit comprising means connected in circuit relation between said trip means and the emitter and the collector of said transistor to apply the voltage between said emitter and said collector to said trip means whenever the current in the emitter-collector path increases to a predetermined value to thereby energize said trip means to open said contacts.

2. In combination, a circuit breaker having trip means, a semiconductor connected in series with the breaker, circuit means connected to apply a predetermined base bias to the semiconductor to render it saturated, circuit means connecting the trip means in shunt relationship with the semiconductor to effect energization thereof in accordance with the voltage across the semiconductor, and additional circuit means connected to reduce the base current to render the semiconductor cut off in response to a predetermined increase in voltage across the semiconductor.

3. The combination with a circuit breaker having trip means operable to open the breaker, of a transistor having emitter and collector electrodes connected in series circuit with the breaker and having a base electrode, means supplying base current to the base electrode of the transistor of a value to limit the current in the circuit to a value the breaker can interrupt, and means connecting the trip means in shunt relationship with the transistor to be energized in accordance with the collector-emitter voltage of the transistor.

4. The combination with a circuit interrupter having trip means responsive to a predetermined value of fault current between a normal value and a predetermined maximum current interrupting value, of semiconductor means connected in series circuit with the interrupter and having base electrode means, circuit means applying a bias voltage to the base electrode means to limit the current in the circuit to a value not in excess of a normal value, means connecting the trip means in shunt relationship with the semiconductor means to be energized in accordance with the voltage thereacross, and means responsive to the current in the circuit to increase the base current of the semi-conductor to increase the current carrying capacity to a value in excess of said predetermined value but below the interrupting value of the interrupter.

5. In combination with a load circuit, a circuit breaker having trip means, semi-conductor means in series with said circuit breaker connecting the load circuit to a source of electrical energy, circuit means connecting the trip means in shunt relationship with the semiconductor means to effect energization thereof in accordance with the voltage across the semiconductor means, circuit means connected to apply a predetermined base bias to the semiconductor means to render the semiconductor means saturated, and means including a Zener diode connected to reduce the base bias to cut off the semiconductor in response to a voltage drop across the semiconductor exceeding a predetermined value.

6. In combination, a circuit breaker having trip means, semiconductor means in series with said circuit breaker connecting a load circuit to a source of electrical energy, circuit means connecting the trip means in shunt relationship with the semiconductor means to effect energization thereof in accordance with the voltage across the semiconductor means, circuit means connected to apply a bias voltage to the base of the semiconductor to render it saturated, and means including an additional semiconductor connected to apply an opposing bias to cut off the first-mentioned semiconductor when the voltage drop across its first semiconductor exceeds a predetermined value.

7. In combination, switch means operable to connect a load circuit to an alternating current source, trip means operable to open said switch means, semiconductor means connected in opposed relation in series with the switch and the load circuit, circuit means connected to normally provide a predetermined base current for the semiconductor means, and additional circuit means connecting the aforesaid circuit means and the trip means to be energized in accordance wtih the voltage across the semiconductor means to cause the semiconductor means to substantially block current flow in the circuit and the switch means to open.

8. Switching means comprising, a pair of series semiconductors connecting a load circuit in series with an alternating current source, circuit means supplying the semiconductors with a minimum value of base current to permit normal load current to flow in the circuit, saturable reactor means connecting the load circuit and the semiconductors to increase the base current of the semiconductors for load current above normal but below a predetermined maximum value, and additional circuit means responsive to load currents above said predetermined value to reduce the base current of the semiconductors.

9. In combination, a serially-related semiconductor connecting a load circuit in series with a source of electrical energy, circuit means including a bias voltage supplying a predetermined base current for the semiconductor to effect saturation, and means including an opposing source of bias voltage and a Zener diode connected in circuit therewith and in shunt with the semiconductor to reduce the base current to cut off the semiconductor whenever the voltage across the semiconductor exceeds a predetermined value.

10. In combination, a pair of semiconductors arranged in opposed relation connecting a load circuit in series with an alternating-current source, means connecting a source of bias voltage to the semiconductors to provide a base current of a value to permit a predetermined current to flow in the load circuit with a minimum voltage drop across the semiconductors, a circuit breaker connected in circuit with the load circuit and in series with said pair of semiconductors, and trip means operable to open the breaker connected across the semiconductors to respond to a voltage greater than said minimum.

11. In combination, a serially-related semiconductor connecting a load circuit in series with a source, means including a source of bias voltage connected to provide a predetermined base current to render the semiconductor conductive, and means including a transformer and rectifier means connected to apply an opposing bias voltage to cause the semiconductor to block the flow of current in the load circuit when the voltage across the semiconductor exceeds a predetermined value.

12. In combination, a serially-related semiconductor connecting a load circuit in series with a direct current source, circuit means connected to provide a predetermined base current for the semiconductor, a static inverter having D.-C. and A.-C. terminals, means including a Zener diode having a breakdown voltage a predetermined amount greater than the voltage drop across the semiconductor for a normal range of current values connecting the D.-C. terminals across the semiconductor, and rectifier means connecting the A.-C. terminals to apply a blocking bias to the semiconductor to terminate the flow of base current when the current in the load circuit exceeds said normal range.

13. In combination, a serially-related semiconductor connecting a load circuit in series with a direct current source, means including a source of bias voltage connected to normally supply base current to the semiconductor, semiconductor means connecting a transformer to an alternating-current source, rectifier means connecting the transformer to oppose the source of bias voltage, and means including a Zener diode having a predetermined breakdown value connecting the semiconductor means and said semiconductor to supply base current to the semiconductor means when the voltage across the semiconductor exceeds a predetermined normal value.

14. In combination, a pair of semiconductors arranged in opposed relation connecting a load circuit in series with an alternating-current source, a circuit interrupter connected in series with the semiconductors and the source, circuit means connecting a source of bias voltage to the semiconductors to render them saturated, trip means operable to open the interrupter, and circuit means including a Zener diode having a breakdown voltage in excess of the normal voltage drop across the semiconductors connecting the trip means thereacross.

15. In combination, a circuit connecting a load to a source of electrical energy, a semiconductor connected in the circuit in series with said load and said source, means connected to supply base current to the semiconductor to normally effect saturation thereof, and means responsive to an increase in current across the semiconductor connected to reduce the base current to cut off the semiconductor.

16. The combination with a load circuit connecting a load to a source, of a semiconductor connected in series with the load circuit, means including a Flip-Flop circuit connected to supply base current to the semiconductor, and means including a Hall generator operated by a predetermined increase in current in the load circuit to trigger the Flip-Flop to interrupt the supply of base current to the semiconductor.

17. In combination, a circuit breaker having openable contacts and trip means energizable to open said contacts, a transistor having a base, an emitter and a collector, the emitter-collector path of said transistor being connected in series with the contacts of said breaker, means connected between said base and said emitter for supplying a bias thereto which renders the emitter-collector path of said transistor normally conducting, and a circuit shunting said transistor, said circuit comprising means connected in circuit relation between said trip means and the emitter and the collector of said transistor to apply the voltage between said emitter and said collector to said trip means whenever the current in the emitter-collector path increases to a predetermined value to thereby energize said trip means to open said contacts, the last-mentioned means comprising a Zener diode connected to be normally blocking and to breakdown when the current in the emitter-collector path of said transistor increases to said predetermined value.

(References on following page)

References Cited in the file of this patent

UNITED STATES PATENTS

| | | |
|---|---|---|
| 1,327,777 | Randall | Jan. 13, 1920 |
| 1,571,304 | Sindeband | Feb. 2, 1926 |
| 1,947,193 | Evans | Feb. 13, 1934 |
| 2,320,929 | Hodnette | June 1, 1943 |
| 2,594,022 | Horton | Apr. 22, 1952 |
| 2,655,608 | Valdes | Oct. 13, 1953 |
| 2,671,874 | Friedrichs | Mar. 9, 1954 |
| 2,693,568 | Chase | Nov. 2, 1954 |
| 2,722,649 | Immel | Nov. 1, 1955 |
| 2,736,822 | Dunlap | Feb. 28, 1956 |
| 2,751,549 | Chase | June 19, 1956 |
| 2,767,330 | Marshall | Oct. 16, 1956 |
| 2,769,131 | Immel | Oct. 30, 1956 |
| 2,776,382 | Jensen | Jan. 1, 1957 |
| 2,783,384 | Bright | Feb. 26, 1957 |
| 2,823,338 | Edsall | Feb. 11, 1958 |
| 2,828,450 | Pinckers | Mar. 25, 1958 |
| 2,832,900 | Ford | Apr. 29, 1958 |
| 2,841,746 | Mawhinney | July 1, 1958 |
| 2,845,583 | Reuther | July 29, 1958 |
| 2,854,615 | Light | Sept. 30, 1958 |
| 2,864,975 | Sumner | Dec. 16, 1958 |
| 2,866,106 | Schuh | Dec. 23, 1958 |
| 2,875,382 | Sandin | Feb. 24, 1959 |
| 2,921,264 | Sundt | Jan. 12, 1960 |
| 2,925,548 | Scherer | Feb. 16, 1960 |
| 2,942,174 | Harrison | June 21, 1960 |

OTHER REFERENCES

A.I.E.E. Transactions, vol. 74, No. 1, March 1955.

Electrical Manufacturing, January 1957, "Static O-C References for Closed Loop Systems."

Electrical Engineering, September 1956.